(12) United States Patent
An

(10) Patent No.: US 9,374,692 B2
(45) Date of Patent: Jun. 21, 2016

(54) METHOD AND TERMINAL FOR PROCESSING MESSAGE SERVICE

(71) Applicant: ZTE CORPORATION, Shenzhen, Guangdong Province (CN)

(72) Inventor: Changhua An, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/419,987

(22) PCT Filed: Aug. 1, 2013

(86) PCT No.: PCT/CN2013/080632
§ 371 (c)(1),
(2) Date: Feb. 6, 2015

(87) PCT Pub. No.: WO2014/023182
PCT Pub. Date: Feb. 13, 2014

(65) Prior Publication Data
US 2015/0195691 A1    Jul. 9, 2015

(30) Foreign Application Priority Data

Aug. 8, 2012  (CN) .......................... 2012 1 0280050

(51) Int. Cl.
*H04W 4/14*   (2009.01)
*H04L 12/58*  (2006.01)
(Continued)

(52) U.S. Cl.
CPC ............... *H04W 4/14* (2013.01); *G06Q 10/107* (2013.01); *H04L 51/12* (2013.01); *H04M 1/72547* (2013.01)

(58) Field of Classification Search
CPC .. H04W 4/14; H04M 1/72547; G06Q 10/107; H04L 51/12
See application file for complete search history.

(56) References Cited

U.S. PATENT DOCUMENTS

| | | | | |
|---|---|---|---|---|
| 6,396,513 | B1* | 5/2002 | Helfman | G06Q 10/107 709/206 |
| 2005/0080642 | A1* | 4/2005 | Daniell | G06Q 10/1073 709/206 |

(Continued)

FOREIGN PATENT DOCUMENTS

| | | |
|---|---|---|
| CN | 1529524 A | 9/2004 |
| CN | 949897 A | 4/2007 |

(Continued)

OTHER PUBLICATIONS

European Search Report dated Jun. 22, 2015 of European patent Application No. 13827962.5.

*Primary Examiner* — Nathan Mitchell
(74) *Attorney, Agent, or Firm* — Plumsea Law Group, LLC

(57) ABSTRACT

A method and terminal for processing message service is provided. The method includes: after receiving a message, a terminal judging whether the message is a blowout-type message or not according to a preset blowout-type message judgment condition, if yes, saving the blowout-type message, and judging whether there exists a blowout-type message group or not; if there already exists the blowout-type message group, judging whether the blowout-type message belongs to the existing blowout-type message group or not according to a preset grouping condition, and if yes, adding the blowout-type message into the blowout-type message group corresponding to the blowout-type message; if there exists no blowout-type message group, grouping the saved ungrouped blowout-type messages according to the preset grouping condition when the number of saved ungrouped blowout-type messages reaches a first threshold.

16 Claims, 2 Drawing Sheets

(51) Int. Cl.
*G06Q 10/10* (2012.01)
*H04M 1/725* (2006.01)

(56) References Cited

U.S. PATENT DOCUMENTS

| 2006/0135136 A1* | 6/2006 | Kim | H04M 1/72544 |
| | | | 455/414.1 |
| 2008/0097946 A1 | 4/2008 | Oliver et al. | |
| 2008/0250084 A1* | 10/2008 | Polimeni | G06Q 10/107 |
| 2012/0151380 A1* | 6/2012 | Bishop | G06Q 10/107 |
| | | | 715/752 |

FOREIGN PATENT DOCUMENTS

| CN | 101389084 A | 3/2009 |
| CN | 101686438 A | 3/2010 |
| CN | 102231874 A | 11/2011 |
| CN | 102801842 A | 11/2012 |

* cited by examiner

METHOD AND TERMINAL FOR PROCESSING MESSAGE SERVICE

CROSS-REFERENCE TO RELATED APPLICATION(S)

This application is the U.S. National Phase application of PCT application number PCT/CN2013/080632 having a PCT filing date of Aug. 1, 2013, which claims priority of Chinese patent application 201210280050.0 filed on Aug. 8, 2012, the disclosures of which are hereby incorporated by reference.

TECHNICAL FIELD

The present document relates to the field of wireless communications, and more particularly, to a method and terminal for processing message service.

BACKGROUND

In today's fast-paced work and life, mobile phones have become an indispensable tool, and message service plays a huge role in everyday life due to its convenience and efficiency. Generally speaking, within a certain range, the whole message service is in a balanced situation over a period of time, but there are some special circumstances, for example, in some special days or occasions, such as spring festival, birthday or company opening, a lot of relevant messages are always received, leading to an explosive growth in the number of messages, which results in the following drawbacks.

1. The processing of ordinary message service is interfered. Take short messages for example, assume it is the spring festival, hundreds of blessing short messages may be received in a very short period of time and these short messages instantly fully occupy the mobile terminal, assume there is a non-blessing short message coming in at this time, the user is difficult to timely detect and process the short message. Meanwhile, due to the huge number of short messages, the storage space is greatly consumed.

2. The amount of unnecessary reading is increased. Still take short messages for example, assume it is the Spring Festival, there may be hundreds of blessing short messages, but their contents may be of only several versions, and the difference may be that the blessing senders at the bottom are different, but the user must click to open the short messages one by one, which wastes a lot of time and effort, and even some similar blessing short messages are directly deleted without reading.

3. The reply is relatively troublesome. Still take short messages for example, assume it is the Spring Festival, the blessings from hundreds of people are suddenly received, but then how to reply these shorts messages. The workload is huge if replying one by one, but if replying through the contacts, on the one hand, there may be some people not in the contacts or whose numbers have been changed, resulting in no reply; on the other hand, blessing languages still have several versions for holiday short messages, and if replying the other party with exactly the same version, it does not look good, therefore the short messages cannot be generally group sent according to the contacts.

SUMMARY

The embodiment of the present document provides a method and terminal for processing message service, to solve the case of explosive growth in the number of message services in a short time due to some special days or occasions such as birthdays, holidays, anniversaries or company openings in the current message service processing mode, and if the messages are received, saved, alerted or displayed as the ordinary messages, not only the normal message service processing is interfered and the amount of readings is increased, but also the reply is inconvenient.

The embodiment of the present document provides a method for processing message service, comprising:

after receiving a message, a terminal judging whether the message is a blowout-type message or not according to a preset blowout-type message judgment condition, and if yes, saving the blowout-type message, and judging whether there exists a blowout-type message group or not;

if there already exists a blowout-type message group, judging whether the blowout-type message belongs to the existing blowout-type message group or not according to a preset grouping condition, and if yes, adding the blowout-type message into the blowout-type message group corresponding to the blowout-type message;

if there exist no blowout-type message group, grouping the saved ungrouped blowout-type messages according to the preset grouping condition when the number of saved ungrouped blowout-type messages reaches a first threshold value;

Wherein, each blowout-type message group comprises remark information, and one or more blowout-type messages; and each blowout-type message carries exclusive information left after removing the remark information from original information of the blowout-type message.

The abovementioned method may have the following feature, the blowout-type message judgment condition comprises:

a preset time and/or preset keywords.

The abovementioned method may have the following feature, the method further comprises: the terminal judging whether the number of blowout-type messages reaches a blowout-type message alert threshold or not, and if yes, alerting the user to perform related processing on the blowout-type messages.

The abovementioned method may have the following feature, the step of the terminal judging whether the number of blowout-type messages reaches a blowout-type message alert threshold or not comprises:

the terminal judging whether the number of unread blowout-type messages reaches a second threshold or not, and/or the number of un-replied blowout-type messages reaches a third threshold or not.

The abovementioned method may have the following feature, the method further comprises: after the terminal receives a display request from the user, displaying the blowout-type messages in accordance with the blowout-type message groups, wherein, each blowout-type message group displays remark information of the blowout-type message group; each blowout-type message in the blowout-type message group displays its individual exclusive information; the ungrouped blowout-type messages display their individual entire information.

The abovementioned method may have the following feature, the method further comprises:

when receiving a request from a user requesting to move a blowout-type message, the terminal moving the blowout-type message to a specified location.

The embodiment of the present document further provides a terminal, comprising: a setting module, a judging module, an analyzing module and a database module, wherein:

the setting module is configured to: set a blowout-type message judgment condition, a grouping condition and a first threshold value;

the judging module is configured to: after receiving a message, judge whether the message is a blowout-type message or not according to the blowout-type message judgment condition, and if yes, save the blowout-type message into the database module;

the analyzing module is configured to: after the judging module saves the blowout-type message into the database module, judge whether there exists a blowout-type message group or not; if there already exists a blowout-type message group, judge whether the blowout-type message belongs to the existing blowout-type message group or not according to the grouping condition, and if yes, then add the blowout-type message into the blowout-type message group corresponding to the blowout-type message; if there exists no blowout-type message group, group the saved ungrouped blowout-type messages according to the grouping condition when the number of saved ungrouped blowout-type messages reaches the first threshold value; and the database module is configured to: save the blowout-type messages and the blowout-type message groups, wherein each blowout-type message group comprises remark information, as well as one or more blowout-type messages; each blowout-type message carries exclusive information left after removing the remark information from the original information of the blowout-type message.

The abovementioned terminal may further have the following feature, the blowout-type message judgment condition comprises:

a preset time and/or preset keywords.

The abovementioned terminal may further have the following feature, the setting module is further configured to: set a blowout-type message alert threshold;

the terminal further comprises an alerting module;

the alerting module is configured to: judge whether the number of blowout-type messages reaches the blowout-type message alert threshold or not, and if yes, alert the user to perform related processing on the blowout-type messages.

The abovementioned terminal may further have the following feature: the alerting module is configured to judge whether the number of blowout-type messages reaches the blowout-type message alert threshold or not in the following manner:

judging whether the number of unread blowout-type messages reaches a second threshold or not, and/or whether the number of un-replied blowout-type messages reaches a third threshold or not.

The abovementioned terminal may further have the following feature, the terminal further comprises a displaying module; wherein, the displaying module is configured to: after receiving a display request from the user, display the blowout-type messages in accordance with the blowout-type message groups, wherein each blowout-type message group displays the remark information of the blowout-type message group; each blowout-type message in the blowout-type message group displays its individual exclusive information; the ungrouped blowout-type messages display their individual entire information.

The abovementioned terminal may further have the following feature, the terminal further comprises a moving module; wherein, the moving module is configured to: when receiving a request from the user requesting to move a blowout-type message, move the blowout-type message to the specified location.

With the method and terminal for processing message service provided in the embodiment of the present document, specific messages are grouped and saved, and displayed using specific modes, thereby reducing the interference to the normal message service, reducing the amount of readings, and being easy to reply.

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

Figure 1:
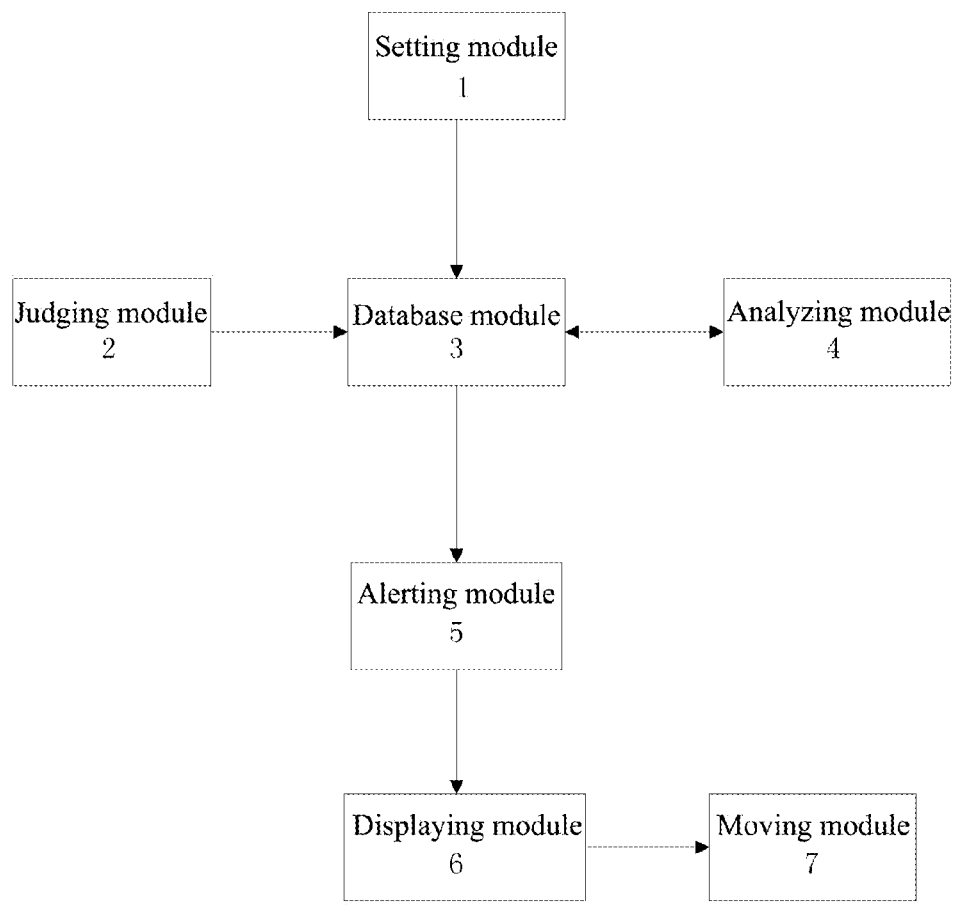
FIG. 1 is a block diagram of a terminal in accordance with an embodiment of the present document.

FIG. 1 shows a block diagram of the terminal in accordance with an embodiment of the present document, and the terminal comprises: setting module 1, judging module 2, database module 3, analyzing module 4, alerting module 5, displaying module 6 and moving module 7, wherein:

the setting module 1 is configured to: set parameters related to the message processing service system. The related parameters comprise a blowout-type message judgment condition, a grouping condition, a first threshold, a blowout-type message alert threshold, and an alerting mode. The blowout-type message judgment condition comprises: a preset time and/or preset keywords, or a time period of processing the blowout-type messages, title of blowout-type message service in a time period, keywords or contacts.

The analyzing module 2 is configured to: after receiving a message, judge whether the message is a blowout-type message or not according to the blowout-type message judgment condition, and if yes, save the blowout-type message into the database module 3; one judgment mode is to judge according to the time period and/or keywords and so on set in the setting module 1.

The database module 3 is configured to: save the blowout-type messages and the blowout-type message groups, wherein each blowout-type message group comprises remark information, as well as one or more blowout-type messages; each blowout-type message carries exclusive information left after removing the remark information from the original information of the blowout-type message. In order to facilitate operations such as screening and searching, as well viewing the data source, in addition, the database module 3 also saves information such as replying and viewing status of the message services.

The analyzing module 4 is configured to: analyze the blowout-type messages. The main content of the analysis is to read the same content of various message services from numerous blowout-type message services, so as to display can be done by sort according to each kind of the same content.

The alerting module 5 is configured to: judge whether the number of blowout-type messages reaches the blowout-type message alert threshold or not, if yes, alert the user to perform related processing on the blowout-type messages. Judging whether the number of blowout-type messages reaches the blowout-type message alert threshold or not comprises: judging whether the number of unread blowout-type messages reaches a second threshold or not, and/or whether the number of un-replied blowout-type messages reaches a third threshold value or not. For example, the judgment can be performed aiming to the number of newly received blowout-type messages, or the number of unread messages, or the number of un-replied short messages (since not replying holiday text messages is not very reasonable, even if the user already read but does not reply the messages, after the number of messages reaches a certain number, the user is also alerted to perform the relevant processing). The alerting mode can be a sound and display interface customized by the user.

The displaying module 6 is configured to: after receiving a display request from the user, display the blowout-type messages in accordance with the blowout-type message groups, wherein each blowout-type message group displays the remark information of the group; each blowout-type message in the blowout-type message group displays its individual exclusive information; the ungrouped blowout-type messages display their individual entire information. During the display, group display is performed according to the results obtained after processing the blowout-type message services in the analyzing module 4, and the remark content in the group name is the same common content, and the message service of each contact in the following is actually the exclusive content after deleting the remark content of the group. The displaying module 6 also supports displaying in accordance with customization, such as read, replied, and so on. In addition, the original information of a certain message can be viewed through a list.

The moving module 7 is configured to: when receiving a request from user requesting to move a blowout-type message, move the blowout-type message to a specified location. Primarily aiming to the case that the blowout-type message service judgment condition set in the setting module 1 may not be very accurate, and results in that certain non-blowout-type message services are mistakenly judged as blowout-type message services to be saved or some normal message services are mistakenly judged as blowout-type message services, when the user is viewing, the messages can be moved, and these mistakenly judged messages are moved to their right locations respectively.

In the embodiment of the present document, the messages comprise short messages, e-mails, and so on.

The embodiment of the present document provides a method for processing message service, comprising:

after the terminal receives a message, judging whether the message is a blowout-type message or not according to the preset blowout-type message judgment condition, and if yes, saving the blowout-type message, and judging whether there exists a blowout-type message group or not;

if there already exists a blowout-type message group, judging whether the blowout-type message belongs to the existing blowout-type message group or not according to the preset grouping condition, if yes, then adding the blowout-type message into the blowout-type message group corresponding to the blowout-type message;

if there exists no blowout-type message group, when the number of saved ungrouped blowout-type messages reaches a first threshold, grouping the saved ungrouped blowout-type messages according to the preset grouping condition;

wherein, each blowout-type message group comprises remark information, and one or more blowout-type messages;

each blowout-type message carries exclusive information left after removing the remark information from the original information of the blowout-type message.

Wherein, the blowout-type message judgment condition comprises:

a preset time and/or preset keywords.

Wherein, the method further comprises that the terminal judges whether the number of blowout-type messages reaches a blowout-type message alert threshold or not, and if yes, alert the user to perform related processing on the blowout-type messages.

Wherein, the step of the terminal judging whether the number of blowout-type messages reaches the blowout-type message alert threshold or not comprises:

the terminal judging whether the number of unread blowout-type messages reaches a second threshold or not, and/or whether the number of un-replied blowout-type messages reaches a third threshold or not.

Wherein, the method further comprises: after receiving a display request from the user, the terminal displaying the blowout-type messages according to the blowout-type message groups, wherein, each blowout-type message group displays the remark information of the group; each blowout-type message in the blowout-type message group displays its individual exclusive information; the ungrouped blowout-type messages display their individual entire information.

Wherein, the method further comprises: when receiving a request from the user requesting to move a blowout-type message, moving the blowout-type message to a specified location.

In the embodiment of the present document, aiming to the blowout-type messages (in the following, for the convenience of description, short messages are taken as the representative of message service to perform the related description), the concept of message group is proposed, since the blowout-type messages are sent intensively in some special occasions, such as the spring festival. The short messages sent in such a festival are usually some blessings plus a handful of personalized information related to the senders. Thus, all the blowout-type messages are divided into groups in accordance with their same contents, when the user is viewing the blowout-type message services of a certain group, the user only needs to view the remark content of the group and information maintained after removing the common contents sent by individual contact, then the contents of the short messages sent by all the persons in the group can be quickly known, which greatly saves the reading time. At the same time, after the blowout-type messages are saved according to the groups, it also makes the reply considerable convenient. Take the abovementioned spring festival short messages for example, the messages can be replied in batch according to their groups, thereby ensuring that the short messages sent by different contacts are different from the short messages sent to the contacts.

In the embodiment of the present document, first judge whether a short message is a blowout-type message or not, if yes, then analyze the short message, and judge to which group that the short message belongs in the blowout-type message library, then display the blowout-type message, and the process comprises the following steps:

Step one, judge whether the short message is a blowout-type message or not.

For ordinary short messages and blowout-type messages, because the information delivered by them is different, so as the processing modes. For blowout-type messages, generally the main contents are some blessings, so that their processing priorities and modes are quite different from the ordinary short messages, therefore first of all, it needs to judge the type of short messages.

The basis of judgment is to judge according to the keywords in the setting module. After a short message is received, firstly search in the content of the short message for whether there are the specified keywords or not, if yes, it indicates that it is a blowout-type message, otherwise it is an ordinary short message, and then enter into its own respective processing procedure.

Step two, judging the group to which the blowout-type message belongs.

For a blowout-type message, for ease of reading and processing, the present application proposed the concept of group. In the actual processing procedure, when the number of received blowout-type messages is greater than N (such as 10), start to divide the groups. The basis of division is to compare any two blowout-type messages, if the similarity between the two exceeds 50%, or 10 consecutive words are exactly the same (the user can automatically set the number via the setting module, and the given number herein is a default number), then they are considered to belong to the same group, the remark information of the group is substantially the similar content (allowing some differences in layout, individual characters and spaces, or symbols), then the blowout-type messages belonging to the group will be listed below each group, of course, the blowout-type messages of the group are short message contents after removing the remark contents of the respective group.

If a new blowout-type message is received afterwards, firstly judge whether the short message belongs to any previously existing group or not, if yes, add a new record directly into the existing group, if no, temporarily save the short message alone and wait to be grouped with the following short messages.

Step three, displaying the processed blowout-type message.

The display herein can be divided into several cases. One case is that when the number of received blowout-type messages reaches a certain threshold, alert the user to display. Since the blowout-type messages usually are short messages aiming for some special days, the key of the messages is the senders rather than the content sent in many times. Therefore the alert message herein will display who send the blowout-type messages to the user, allowing the user to obtain the information about a lot of senders in one short message, if the user wants to view the short message from a certain contact, the user only needs to click the contact's name to enter into the contact's short message to view it. If the user wants to view and process all the blowout-type messages, the user clicks all the short messages to reply.

When the user clicks the "view all messages" button of the blowout-type messages, or directly enters into the directory where the blowout-type messages are saved to view, the user enters into the main interface of the blowout-type messages. The blowout-type messages displayed at this time are divided into different groups, the user only needs to view the remark contents of the groups and the following exclusive contents of the respective contacts to basically know the contents of the short messages sent by the respective contacts. Of course, the user can set an information filtering criteria displayed under the groups, for example, only display the unread, only display the non-replied, and so on. In addition, for those blowout-type messages which are not divided into any groups, they are all displayed at the end.

Figure 2:
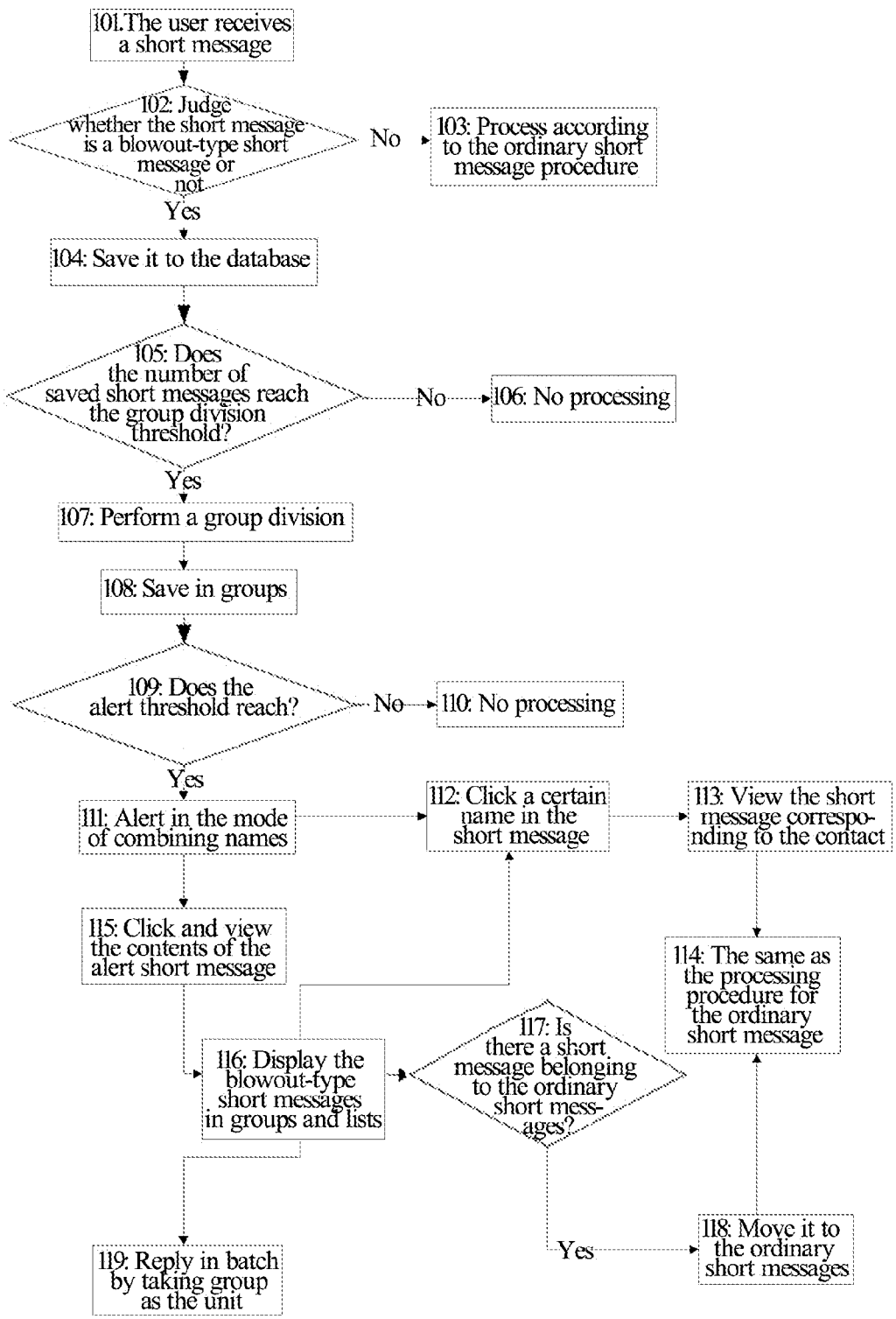
FIG. 2 is a flow chart of a method for processing message service in accordance with an embodiment of the present document.

For convenience of description, in the following, short messages are taken as a representative of the messaging service to describe the message service processing procedure in detail in the form of a flowchart, as shown in FIG. 2, it comprises the following steps.

In step 101, the user's cell phone receives a short message, and the type of the short message is unknown.

In step 102, according to the current time and the set keywords, judge whether the short message belongs to a blowout-type message which belongs to a certain special occasion and is preset in the setting module or not.

In step 103, if it is determined that the short message is not a blowout-type message, process the short message according to the ordinary short message procedure, that is, save the short message in the inbox of the short message module and the reading status is unread.

In step 104, if it is determined that the short message is a blowout-type message of a special occasion, save the short message contents in the storage database that saves the blowout-type messages.

In step 105, the blowout-type messages that are saved in the database will not be divided immediately into groups, only when the number of blowout-type messages reaches a certain threshold can the group division be facilitated, and the number is defaulted as 10.

In step 106, if the number does not reach the one for a group division, do not process temporarily, because in general, the blowout-type message alert threshold is larger than the threshold for group division.

In step 107, if the number of blowout-type messages saved in the databases is greater than the threshold value, start to perform group division, and group all the current blowout-type messages according to the basis of division preset in the setting module.

In step 108, the short messages went through the group division are re-saved into the database, wherein a table is created for each group and then the messages are saved according to the groups, each short message will mark the exclusive content after removing the remark contents of each group.

In step 109, judge whether the number of blowout-type messages reaches an alert threshold or not, where the alert threshold is set by the setting module, and the alert threshold may be aiming to the number of unread messages in the blowout-type message or the number of un-replied messages in the blowout-type message.

In step 110, if the alert threshold is not reached, do not initiatively inform the user some information related to the blowout-type message, and of course, if the user wants to know the relevant information, the user can enter into the place saving these messages, and initiatively view the messages.

In step 111, if the alert threshold is reached, initiatively alert the user that the relevant messages need to be processed.

The alert message comprise: names, as well as a notification about which received messages are still not read or replied.

In steps 112 to 114, when the user reads the alert message, the name of each contact inside is actually a link, and the user can click a certain name therein to view the actual contents of the short message corresponding to the contact.

In steps 115 to 116, if the user is not concerned about the message of a particular contact, the user can view all the messages, at this time the user enters into the main display interface of the blowout-type messages, that is, the list interface where the display is implemented according to each group.

In steps 117 to 118, when the user views the main display interface of the blowout-type messages, the user may find that some of the short messages are not blowout-type messages, at this time, the user can move these short messages to the folder corresponding to the ordinary short messages to save and perform the related processing.

In step 119, the user can operate, such as reply, delete, and so on, the blowout-type message in the unit of group.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document and not intended to limit the present document, and for a person skilled in the art, the embodiments of the present document may have a variety of changes and modifications. Any changes, equivalents and improvements made within the spirit and principle of the present document should be included within the protection scope of the present document.

INDUSTRIAL APPLICABILITY

With the method and terminal for processing message service provided in the embodiment of the present document, specific messages are grouped and saved, and displayed using specific modes, thereby reducing the interference to the normal message service, reducing the amount of readings, and being easy to reply.

What I claim is:

1. A method for processing message service, comprising:
   after receiving a message, a terminal judging whether the message is a first type message or not according to a preset first type message judgment condition, and if yes, saving the first type message, and judging whether there exists a first type message group or not;
   if there already exists a first type message group, judging whether the first type message belongs to the existing first type message group or not according to a preset grouping condition, and if yes, adding the first type message into the first type message group corresponding to the first type message;
   if there exists no first type message group, grouping the saved ungrouped first type messages according to the preset grouping condition when a number of the saved ungrouped first type messages reaches a first threshold value;
   wherein, each first type message group comprises remark information and one or more first type messages; and each first type message carries exclusive information left after removing the remark information from original information of the first type message;
   further comprising: the terminal judging whether the number of first type messages reaches a first type message alert threshold or not, and if yes, showing an alert message to alert a user to perform related processing on the first type messages; wherein the alert message comprises a contact name, a notification about which received messages are still not read or replied, and the contact name is a link with which the user can click a certain contact name to view contents of the message corresponding from a contact.

2. The method of claim 1, wherein, the first type message judgment condition comprises:
   a preset time and/or preset keywords.

3. The method of claim 1, wherein, the step of the terminal judging whether the number of first type messages reaches a first type message alert threshold or not comprises:
   the terminal judging whether a number of unread first type messages reaches a second threshold or not, and/or a number of un-replied first type messages reaches a third threshold or not.

4. The method of claim 1, further comprising:
   after the terminal receives a display request from the user, displaying the first type messages in accordance with the first type message groups, wherein, each first type message group displays the remark information of the first type message group; each first type message in the first type message group displays its individual exclusive information; ungrouped first type messages display their individual entire information.

5. The method of claim 1, further comprising:
   when receiving a request from a user requesting to move a certain first type message, the terminal moving the first type message to a specified location.

6. A terminal, comprising a memory, and a processor configured to:
   set a first type message judgment condition, a grouping condition and a first threshold value;
   after receiving a message, judge whether the message is a first type message or not according to the first type message judgment condition, and if yes, save the first type message into the memory;
   saving the first type message into the database module, judge whether there exists a first type message group or not; if there already exists a first type message group, judge whether the first type message belongs to the existing first type message group or not according to the grouping condition, and if yes, then add the first type message into the first type message group corresponding to the first type message; if there exists no first type message group, group saved ungrouped first type messages according to the grouping condition when a number of the saved ungrouped first type messages reaches a first threshold value; and
   save the first type messages and the first type message groups, wherein each first type message group comprises remark information, as well as one or more first type messages; each first type message carries exclusive information left after removing the remark information from the original information of the first type message;
   the processor is further configured to:
   set a first type message alert threshold;
   judge whether the number of first type messages reaches the first type message alert threshold or not, and if yes, show an alert message to alert a user to perform related processing on the first type messages; wherein the alert message comprises a contact name, a notification about which received messages are still not read or replied, and the contact name is a link with which the user can click a certain contact name to view contents of the message corresponding from a contact.

7. The terminal of claim 6, wherein, the first type message judgment condition comprises:

a preset time and/or preset keywords.

8. The terminal of claim 6, wherein, the processor is further configured to judge whether the number of first type messages reaches the first type message alert threshold or not in the following manner:

judging whether a number of unread first type messages reaches a second threshold or not, and/or whether a number of un-replied first type messages reaches a third threshold or not.

9. The terminal of claim 6, the processor is further configured to:

after receiving a display request from the user, display the first type messages in accordance with the blowout first type message groups, wherein each first type message group displays the remark information of the first type message group; each first type message in the first type message group displays its individual exclusive information; ungrouped first type messages display their individual entire information.

10. The terminal of claim 6, the processor is further configured to:

when receiving a request from the user requesting to move a first type message, move the first type message to a specified location.

11. The method of claim 2, further comprising:

when receiving a request from a user requesting to move a certain blowout first type message, the terminal moving the first type message to a specified location.

12. The method of claim 4, further comprising:

when receiving a request from a user requesting to move a certain first type message, the terminal moving the first type message to a specified location.

13. The method of claim 4, further comprising:

when receiving a request from a user requesting to move a certain first type message, the terminal moving the first type message to a specified location.

14. The terminal of claim 7, the processor is further configured to:

when receiving a request from the user requesting to move a first type message, move the first type message to a specified location.

15. The terminal of claim 8, the processor is further configured to:

when receiving a request from the user requesting to move a first type message, move the first type message to a specified location.

16. The terminal of claim 9, the processor is further configured to:

the moving module is configured to: when receiving a request from the user requesting to move a first type message, move the first type message to a specified location.

\* \* \* \* \*